(12) United States Patent
Finn, III et al.

(10) Patent No.: US 11,682,886 B1
(45) Date of Patent: Jun. 20, 2023

(54) FOLDABLE ELECTRICAL CABLE CLAMP

(71) Applicant: Genwire LLC, Black Diamond, WA (US)

(72) Inventors: James Henry Finn, III, Graham, WA (US); Fraser McKay, Black Diamond, WA (US)

(73) Assignee: Genwire LLC, Black Diamond, WA (US)

( * ) Notice: Subject to any disclaimer, the term of this patent is extended or adjusted under 35 U.S.C. 154(b) by 0 days.

(21) Appl. No.: 17/863,060

(22) Filed: Jul. 12, 2022

(51) Int. Cl.
*F16B 2/06* (2006.01)
*H02G 3/08* (2006.01)
*H02G 3/04* (2006.01)

(52) U.S. Cl.
CPC ............ *H02G 3/0406* (2013.01); *F16B 2/06* (2013.01); *H02G 3/08* (2013.01)

(58) Field of Classification Search
CPC ............ H02G 3/0406; H02G 3/08; F16B 2/06
USPC .......................................................... 174/50
See application file for complete search history.

(56) References Cited

U.S. PATENT DOCUMENTS

| | | |
|---|---|---|
| 6,682,355 B1 | 1/2004 | Gretz |
| 6,737,584 B2 | 5/2004 | Kiely |
| 6,727,604 B2 | 12/2004 | White |
| 6,872,886 B2 | 3/2005 | Kiely |
| 7,154,054 B1 | 12/2006 | Gretz |
| 7,390,979 B1 | 6/2008 | Johnson |
| 7,824,213 B1 | 11/2010 | Korez et al. |
| 8,129,634 B2 | 3/2012 | Sheehan et al. |
| 8,487,196 B1 * | 7/2013 | Baldwin ............... H01R 13/506 |
| | | 174/562 |
| 8,857,039 B2 | 10/2014 | Sathyanarayana et al. |
| 9,614,297 B2 | 4/2017 | Boaz et al. |
| 9,705,296 B1 | 7/2017 | Smith |

(Continued)

FOREIGN PATENT DOCUMENTS

KR  10-2011154  8/2019

OTHER PUBLICATIONS

Carlton Connectors, ½ in. PVC Snap-In NM Connectors (Home Depot) Apr. 2022.

(Continued)

*Primary Examiner* — Timothy J Thompson
*Assistant Examiner* — Michael F McAllister
(74) *Attorney, Agent, or Firm* — Sierra IP Law, P.C.; Mark D. Miller

(57) ABSTRACT

Disclosed are methods and apparatus for providing and installing electrical wire connector clamps that may be inserted into knockout holes from the inside of an electrical box or panel, that are capable of holding multiple wires or cables, that may be run through the connector before it is slotted into the hole, and that use only a minimal amount of interior space of the electrical box or panel. Embodiments of the present invention include semi-cylindrical units that may be folded together around one or more wires for secure engagement with the wires and with a knockout hole of an electrical box or panel. Embodiments may be used in new construction, and to replace existing connector clamps in an electrical box or panel from the inside without damaging the walls surrounding the box or panel, in order to securely hold wires in an electrical box or panel, add new wire(s), hold multiple wires, and/or increase available space inside the box or panel.

19 Claims, 9 Drawing Sheets

(56) References Cited

U.S. PATENT DOCUMENTS

| | | | |
|---|---|---|---|
| 9,935,435 B2 | 4/2018 | Smith | |
| RE47,893 E | 3/2020 | Chavan et al. | |
| 10,897,127 B2* | 1/2021 | Korcz | H02G 3/085 |
| 2005/0227530 A1 | 10/2005 | Castaldo et al. | |
| 2008/0171464 A1 | 7/2008 | Keeven et al. | |
| 2015/0090488 A1* | 4/2015 | Laverdiere | H02G 3/083 |
| | | | 174/660 |
| 2017/0018338 A1* | 1/2017 | Antonucci | H02G 3/083 |
| 2019/0207372 A1* | 7/2019 | Korcz | H02G 3/085 |
| 2021/0226393 A1 | 7/2021 | Byrne | |

OTHER PUBLICATIONS

Bridgeport Connectors, ½ in. PVC Snap-In NM Connectors, Apr. 2022 (https://www.gordonelectricsupply.com/p/Bridgeport-616-Nmd-1-2-Nm-B-Connector/5773794?gclid=EAIalQobChMI9Jn8_Obx-AIVlw_nCh1DyQpcEAQYAiABEgLk9fD_BwE).

Zoro non metallic plastic connector ¾, Apr. 2022 (https://www.zoro.com/gampak-nm-plastic-connector-34-49741/i/G8623269/?q=G8623269).

Halex non metallic push-in connector ⅜, Apr. 2022.

Inside the Box MC connector installation, Sep. 24, 2019 (https://www.youtube.com/watch?app=desktop&v=fXYVtTeaDu4).

Sigma Engineered Solutions NM Cable Connector ⅜ in. D 1 pk, Apr. 2022 (https://www.acehardware.com/departments/lighting-and-electrical/boxes-fittings-and-conduit/cable-connectors/3182805?gclid=EAIalQobChMI7rG44ubx-AIVBhmtBh0ZVwKYEAQYASABEgKwKfD_BwE&gclsrc=aw.ds).

\* cited by examiner

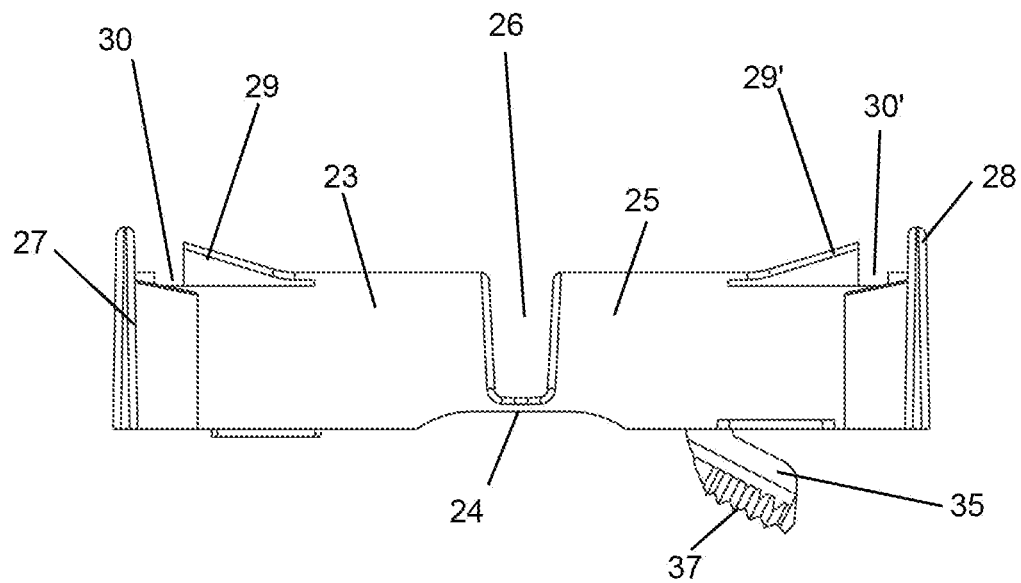
FIG. 3
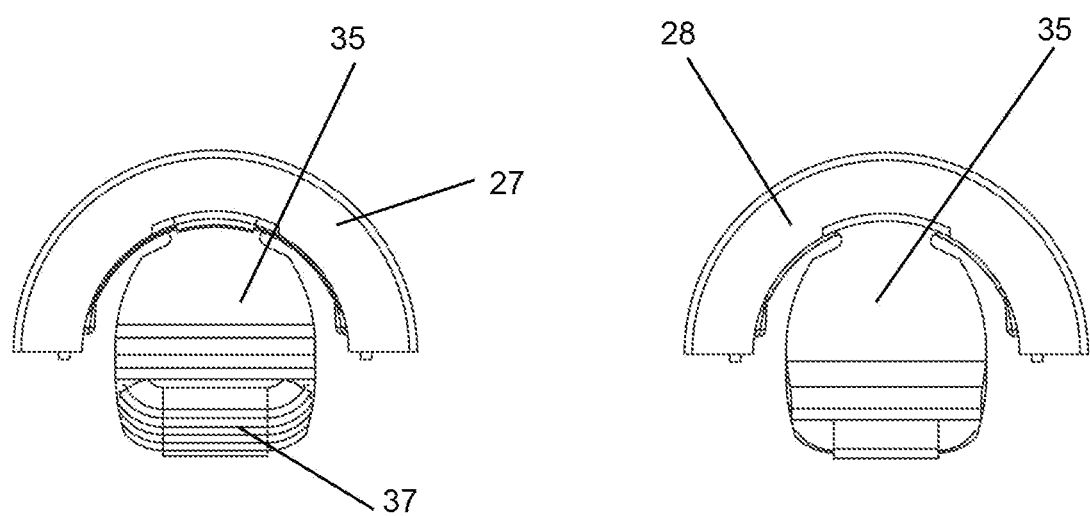
FIG. 4
FIG. 5

FOLDABLE ELECTRICAL CABLE CLAMP

BACKGROUND OF THE INVENTION

The present invention relates to installation of electrical cable and wiring in buildings and structures, and more particularly to a fold over clamp for holding electrical cable or wire that may be engaged with the cable or wire and inserted into the wall of an electrical box from the inside, and related methods of manufacture and use.

Electrical boxes are commonly used in the building industry to enclose sockets, switches, dimmers or other electrical components. During construction, electrical boxes and/or electrical panels are ordinarily attached to studs or wall frame members, and electrical wiring is run to each box. This wiring typically enters the box through a round opening in a side or end of the electrical box or panel known as a knockout, and leads from the component(s) inside the box to a source of power. For safety, security and code requirements, it is important to avoid having loose wires extending through the knockout holes in electrical boxes or panels. As a result, various connectors have been developed that securely hold electrical wires and snugly fit into a knockout hole of an electrical box or panel.

Many existing electrical connectors are designed to be inserted into knockout holes from the outside. These connectors are useful for new construction since the connectors may be installed before any walls are attached, but they cannot be installed into existing walls without tearing out a portion of the wall outside of the electrical box or panel, which must then be repaired, retextured and repainted. This can be time consuming and costly, and can leave a scar on the repaired wall. To avoid this problem, other connectors have been developed that are capable of being inserted into a knockout hole from either the inside or the outside of the electrical box. However, in order to provide sufficient securement of the wires and also house the wire gripping apparatus, these connectors must be rigid and elongated, and ordinarily require that the wire be run through the connector before it is installed into the electrical box, limiting flexibility of use. The requirement to run the wire before inserting the connector, together with the rigidity of these connectors makes it difficult to use them with multiple wires, and also makes it extremely difficult to run a new wire to an existing electrical box through such a connector along with an existing wire already in place. Because of their design, existing non-metallic connectors require an electrician to slot the connector into the hole before running the cable through it, which can be a difficult, frustrating and time consuming process. In addition, one of the elongated ends of such connectors will necessarily protrude into the electrical box. This protrusion crowds the interior of the box, interfering with other wires and/or components inside the box, and potentially preventing the box from accepting larger components.

It is therefore desirable to provide electrical wire connector clamps that may be installed into knockout holes from the inside of an electrical box or panel, that are capable of holding multiple wires or cables, that may be run through the connector before it is slotted into the hole, and that use only a minimal amount of interior space of the electrical box or panel.

Embodiments of the present invention provide methods and apparatus which address these needs.

SUMMARY OF THE INVENTION

Embodiments of the present invention provide methods and apparatus for providing electrical wire connector clamps that may be installed into knockout holes from the inside of an electrical box or panel, that are capable of holding multiple wires or cables, that may be run through the connector before it is slotted into the hole, and that use only a minimal amount of interior space of the electrical box or panel. Embodiments of the present invention may be used in new construction, and to replace existing connector clamps in an electrical box or panel from the inside of the box or panel without damaging the walls surrounding the box or panel, in order to add new wire(s), hold multiple wires, and/or increase available space inside the box or panel.

Embodiments of the clamps of the present invention may include a semi-cylindrical unit (half pipe) having a convex exterior and a concave interior, a central opening bisecting the unit into halves, and two hinge members at opposite ends of the central opening which connect the two halves together. Folding the two halves of the unit together along the hinge members widens the central opening, and brings the two semi-cylindrical halves together to form a full cylinder having the central opening at one end, and forming a circular opening at the opposite end. Peripheral semi-circular ridges or flanges may be provided at opposite ends of the unfolded unit which form a circular ridge or annular flange around the opposite end opening when the two halves of the unit are folded together. In embodiments of the invention, one or more frictional gripping surfaces, structures or members may be provided on inside surfaces of the semi-cylindrical halves of the unfolded unit. These gripping surfaces, structures or members are designed to engage and secure one or more wires extending through the unit when the halves are folded together. One or more wires may be inserted through the central opening from either side of the unfolded unit. These wires are then securely gripped and extend through the circular opening formed when the halves of the unit are folded together.

In some embodiments, one or more outwardly extending longitudinal tapered tabs may be provided on the outside convex surfaces of the semi-circular halves of the unit, and a small gap may be provided between the edges of these tabs and the semi-circular flanges at each of the opposite ends of the unfolded unit. This gap should have approximately the same thickness as a wall of the electrical box. When a unit having these features is folded together into a cylinder forming the circular flange, the cylinder may then be inserted into a knockout hole of an electrical box from the inside of the box. When inserted, the longitudinal tabs snap through the knockout hole to the outside of the box, with the wall of the electrical box fitting into the gap between these tabs and the circular flange of the folded unit, thereby securely holding the unit in place with the circular flange flush against an inside surface of the box. The longitudinal tabs which hold the unit in the hole are designed so that the taper of the tabs helps squeeze the two halves of the unit together during insertion.

In some embodiments, interior wire gripping members may be provided in the form of one or more frictional surfaces on the inside concave edges of each of the semi-circular halves of the unit. In addition, or alternatively, the wire gripping members may be provided in the form of one or more frictional structures on the inside of each half. The frictional surfaces or structures may be the same, for example and without limitation, the surfaces or structures on both halves may be in the form of ridges, or the surfaces or structures on both halves may be in the form of teeth, etc. Alternatively, the surfaces or structures may be different on each half, for example, and without limitation, the surface(s) or structure(s) on one half may be in the form of ridges, while the surface(s) or structure(s) on the other half may be in the form of teeth, etc. Complementary surfaces or structures may be provided on each of the halves. For example, and without limitation, complementary ridges may be provided on the inside concave surfaces of each of the two halves. It is to be appreciated that frictional surfaces such as ridges or teeth may have different sizes and shapes to accommodate securing different sizes or numbers of wires. In some embodiments, the ridges, teeth, rough surfaces or frictional surfaces on each half may be directly across from and protrude out so that they come close to each other when the halves are closed, leaving a small gap for one or more wires to extend through. In these embodiments, different sized ridges, teeth, rough surfaces or frictional surfaces may be used to form different sized gaps for different sized or multiple wires. For example, and without limitation, larger ridges, teeth, rough surfaces or frictional surfaces may form smaller gaps for smaller wires; smaller ridges, teeth, rough surfaces or frictional surfaces may form wider gaps for larger or multiple wires. In some embodiments, the ridges, teeth, rough surfaces or frictional surfaces may be directly across from each other. In some embodiments, the ridges, teeth, rough surfaces or frictional surfaces may be staggered or offset from each other. In some embodiments, they may interleave when the halves are closed, causing the wires to follow a somewhat serpentine path.

In some embodiments, one or more gripping members may be provided on the inside of one or both of the halves of the connector clamp units which protrude out therefrom. In some embodiments, a gripping member may be in the form of a finger extending outwardly from the inside concave surface of one of the halves of an unfolded unit. The proximal end of the finger may be flexibly attached to the inside surface of the half in such a way that it is flexibly urged outward away from the unit. The distal end of the finger may be provided with a frictional surface which may be in the form of ridges, teeth, rough surface or another frictional pattern. A complementary frictional surface may be provided on the inside concave surface of the other half of the unit, and may also be in the form of ridges, teeth, rough surface, or other frictional pattern. The complementary frictional surface need not be the same as the frictional surface of the finger, and it may but need not be directly across from the finger when the unit is folded closed. For example, and without limitation, the frictional surface on the finger may be in the form of teeth, and the complementary surface on the convex interior of the other half may be in the form of ridges. In other embodiments, the frictional surface at the end of the finger may be offset from the frictional surface on the inside of the opposite half. In other embodiments more than one frictional surface may be provided on the opposite half from the finger for multiple engagements with wires extending through the unit. In these embodiments, when the halves are closed, the frictional surface of the finger is urged toward the inside surface of the other half of the unit. In some embodiments, in the absence of any wires, the frictional surface of the finger may touch a frictional surface of the opposite half when the unit is folded together. When one or more wires are present, the flexibility of the finger allows the wires to be gripped between the frictional surfaces at the end of the finger and those on the inside surface of the opposite half.

In some embodiments, a gap may be provided between the frictional surface of the finger and the frictional surface(s) of the opposite half when the halves are folded together. In these embodiments, the size of the finger may be varied to create different sized gaps to accommodate different sized wires. For example, and without limitation, a longer finger may be provided to create a smaller gap for smaller wires, and a shorter finger may be provided to create a larger gap for larger or multiple wires.

In alternative embodiments, multiple flexibly attached fingers may be provided. For example, and without limitation, one finger may be provided on the inside concave surface of each half of a unit. In these embodiments, the fingers may touch each other when the unit is folded closed, or they may be offset so as not to interfere with each other. In other embodiments, two fingers may be provided in one half of a unit, with no fingers in the other half of the unit. It is to be appreciated that different combinations of multiple fingers may be provided in different embodiments, and that they may or may not touch, and may or may not be offset from each other when the unit is closed. It is also to be appreciated that in multiple finger embodiments, the fingers may be provided with the same or different frictional surfaces, and the same or different frictional surfaces may be provided on the opposite half from the finger, which may or may not be offset or staggered from the finger(s).

Embodiments of the present invention may accommodate all of the following cable sizes: 14/2, 14/3, 14/2×2 (a double run of 14/2), 12/2, 12/2×2, 12/3, 10/2, 10/3.

Embodiments of the units of the present invention may be provided in the form of a single molded piece made of rigid plastic or other similar material. The material at the edges of the central opening may be thinner than other parts of the unit in order to allow these areas to be deformable and act as hinges when the halves of the unit are folded together to form a cylinder. Similarly, the material attaching the outwardly extending longitudinal tabs to the outside surfaces of the unit may be thinner than other parts of the unit to allow this material to deform slightly allowing the tabs to move and then pop back into place when they are inserted through a knockout hole in an electrical box.

In other embodiments, the units of the present invention may be provided as two distinct halves that are assembled together. The two halves may have complementary edges where they are joined at the ends of the central opening, with the edges snapping together to form a pair of pivots at either end of the central opening. These pivots allow the two halves to be folded together to form a cylinder. In other embodiments, the two halves may be fastened together using separate hinges or pivot members attached at each end of the central opening that allow the halves to be folded together to form a cylinder.

In an exemplary installation, one or more wires are to be run into an electrical box. The wires are first passed from the outside of the electrical box to the inside of the box through a knockout hole. The wires are then threaded through the central opening of an unfolded unit. Since the unit will eventually be folded and inserted into the knockout hole, the wires should be threaded into the central opening such that the outside (convex side) of the unfolded unit faces and is closest to the knockout hole. The unit is moved along the wires to a position that provides a desired amount of slack on the inside of the electrical box. The semi-circular halves of the unit are then folded together to form a cylinder around the wires. This causes the frictional surfaces, structures or members inside the unit to firmly grip the wires extending therethrough. The unit, now firmly secured to the wires, is then pushed through the knockout hole from which the wires enter the unit, causing the longitudinal tabs to pop through the hole, leaving only the flush circular flange of the unit on the inside of the box around the knockout hole. It is to be appreciated that the engagement of the longitudinal tabs and the circular ridge with the knockout hole in the electrical box keeps the two halves of the unit securely engaged with each other and with the electrical box, thereby securely holding the wires contained therein.

In one aspect, the invention includes a wire clamp for use with an electrical box comprising a semi-cylindrical unit having a convex exterior surface and a concave interior surface; a central opening bisecting the unit into a first semi-cylindrical half and a second semi-cylindrical half, with two hinge members located at opposite ends of the central opening which movably connect the first and second halves together; a first semi-circular peripheral flange is located at an open end of the first half opposite from the central opening, and at least one deformable tapered tab is located on the exterior surface adjacent to the first peripheral flange; a second semi-circular peripheral flange is located at an open end of the second half opposite from the central opening, and at least one second deformable tapered tab is located on said exterior surface adjacent to the second peripheral flange; and at least one frictional member provided on an interior surface of at least one of the semi-cylindrical halves of said unit.

In another aspect, methods are provided for securely holding one or more wires in an electrical box by first passing at least one wire from outside the electrical box to an inside of the box by extending an end of the wire through a knockout hole in the box; then passing the end of the wire through a central opening of a semi-cylindrical unit having a convex exterior side and a concave interior side such that the end of the wire is on the concave interior side of the unit, the opening bisecting the unit into a first semi-cylindrical half and a second semi-cylindrical half, the unit having two hinge members located at opposite ends of the central opening which movably connect the first and second halves together, the unit having at least one frictional surface, structure or member on said concave interior side; then folding the two semi-cylindrical halves together to form a cylinder around the wire such that the frictional surface, structure or member firmly engages the wire; and then inserting the formed cylinder into the knockout hole. In other aspects, semi-circular flanges are provided at opposite ends of the unit such that a circular flange is formed during the step of folding the two semi-cylindrical halves together. In other aspects, the circular flange is flush against an inside surface of the box after the formed cylinder is inserted into the knockout hole. In other aspects, at least one deformable tab is provided on the convex side of the unit adjacent to each of the semi-circular flanges, such that when the formed cylinder is inserted into the knockout hole, the tabs deform and then pop back such that the semi-circular flanges and the tabs hold the cylinder in place in the knockout hole.

It is therefore an object of the present invention to provide electrical wire connector clamps that may be installed into knockout holes from the inside of an electrical box or panel.

It is also an object of the present invention to provide electrical wire connector clamps that use only a minimal amount of interior space inside the electrical box or panel.

It is also an object of the present invention to provide electrical wire connector clamps that are capable of holding single or multiple wires.

It is also an object of the present invention to provide electrical wire connector clamps that may be retrofitted into an existing electrical box or panel without damaging existing adjacent walls.

It is also an object of the present invention to provide electrical wire connector clamps that may be used for holding new wires added to an installed electrical box or panel through the same knockout hole as existing wires.

It is also an object of the present invention to provide electrical wire connector clamps that are easily manufactured, installed and removed.

It is also an object of the present invention to provide methods for installing and using electrical wire connector clamps in either new or existing construction.

It is also an object of the present invention to provide methods that give an electrician the option of either slotting a connector clamp of the present invention into a knockout hole before inserting wires or cables, or running the wires or cables through a connector clamp of the present invention and then slotting it into the knockout hole.

Additional objects of the invention will be apparent from the detailed descriptions and the claims herein.

BRIEF DESCRIPTION OF THE DRAWINGS

FIG. 3 is a side bottom view of an embodiment of the present invention in an unfolded state.

FIG. 4 is an end view of an embodiment of the present invention in an unfolded state.

FIG. 5 is an opposite end view of an embodiment of the present invention in an unfolded state.

DETAILED DESCRIPTION

Figure 1:
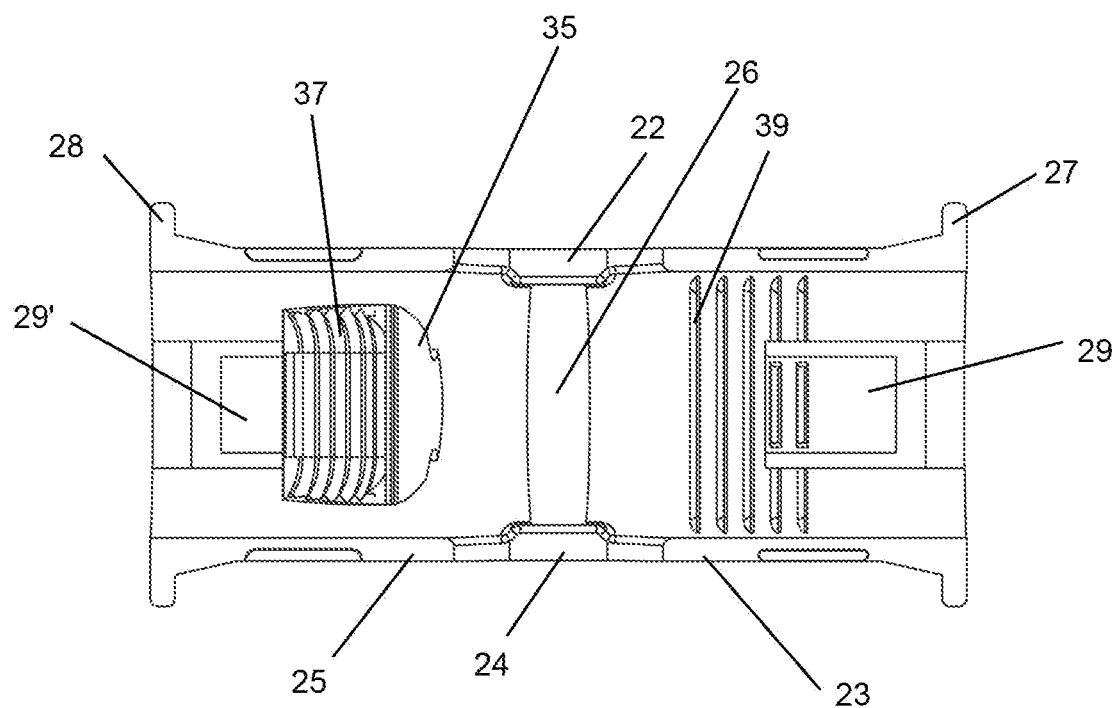
FIG. 1 is a bottom view of an embodiment of the present invention in an unfolded state.
Figure 2:
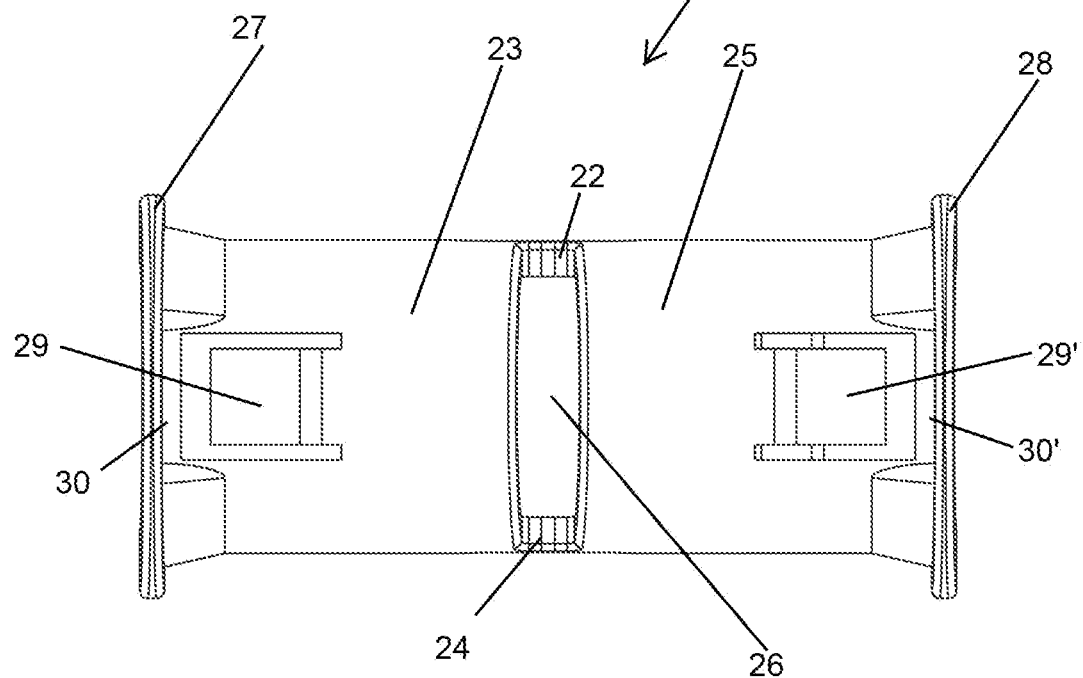
FIG. 2 is a top view of an embodiment of the present invention in an unfolded state.

Referring to the drawings wherein like reference characters designate like or corresponding parts throughout the several views, and referring particularly to the exemplary unfolded embodiment of FIGS. 1-7, it is seen that in this illustrated embodiment, a semi-cylindrical unit 21 is provided having a generally concave interior and a generally convex exterior, with a first semi-cylindrical half 23 and a second semi-cylindrical half 25, the two halves being separated by a central opening 26. The two halves 23, 25 are connected together at opposite ends of opening 26 by hinge members 22 and 24. In the exemplary illustrated embodiment, it is seen that unit 21 has a first semi-circular flange 27 at one end, and a second semi-circular flange 28 at the opposite end. A plurality of tapered longitudinal tabs 29, 29' are provided along the outside surfaces of the two halves extending radially outward therefrom, defining gaps 30, 30' between these flanges 29, 29', respectively, and semi-circular flanges 27, 28. Longitudinal tabs 29, 29' may be tapered downward toward the central opening and may be depressed to facilitate insertion into a knockout hole as described below.

Hinge members 22, 24 may be provided in the form of deformable material as shown in the illustrated embodiment allowing the two halves 23, 25 to be folded against each other to form a cylinder, as illustrated in FIGS. 8-11. In alternative embodiments, the hinge members connecting halves 23, 25 may be separately attached at opposite ends of the central opening 26.

Figure 6:
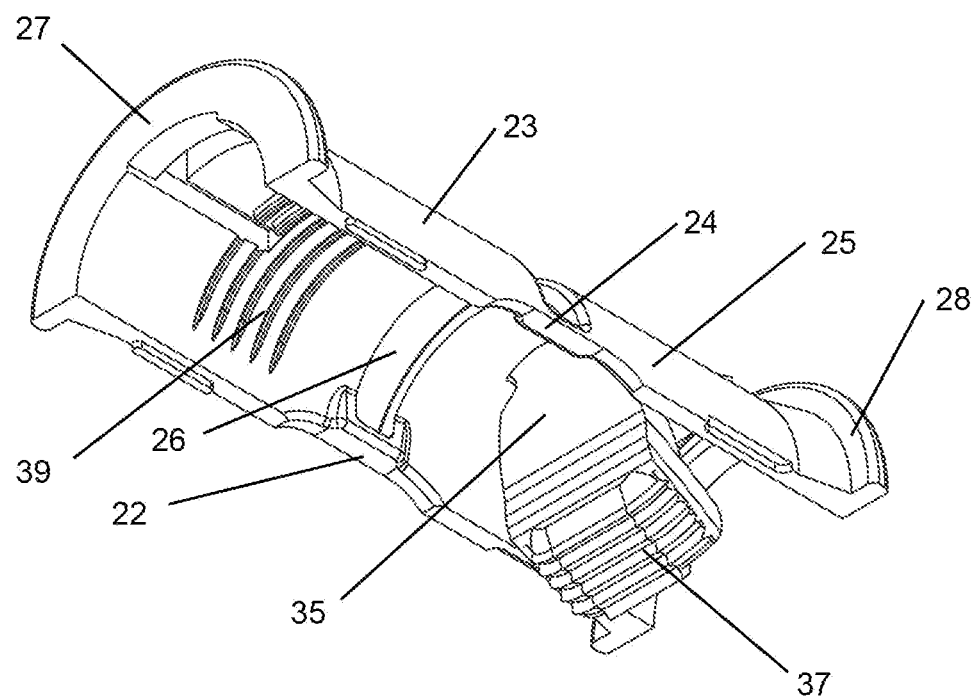
FIG. 6 is a bottom perspective view of an embodiment of the present invention in an unfolded state.
Figure 7:
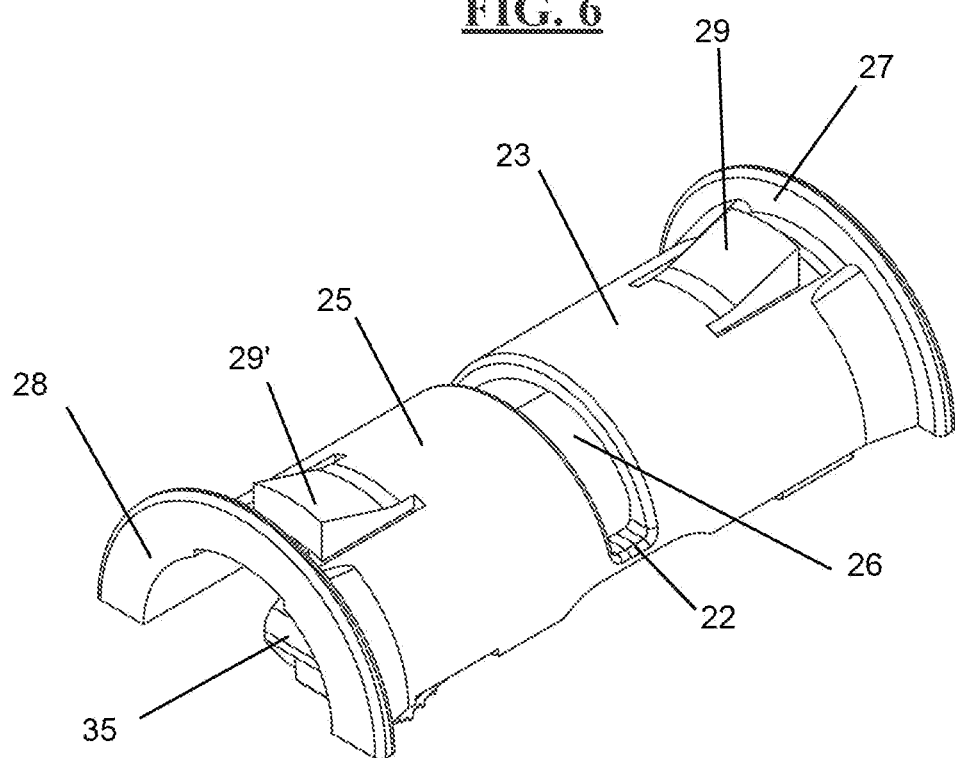
FIG. 7 is a top perspective view of an embodiment of the present invention in an unfolded state.
Figure 8:
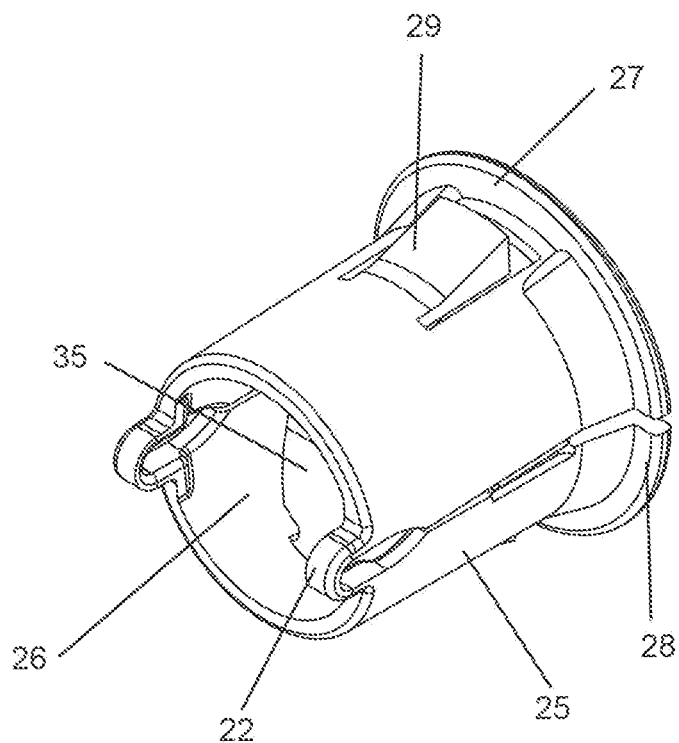
FIG. 8 is a side perspective view of an embodiment of the present invention in a folded state.
Figure 9:
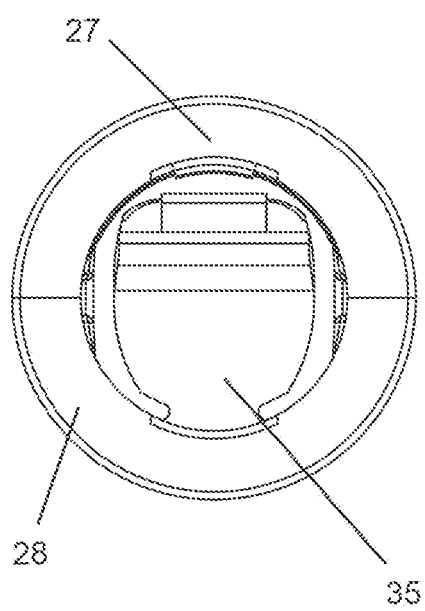
FIG. 9 is an end view of an embodiment of the present invention in a folded state.
Figure 10:
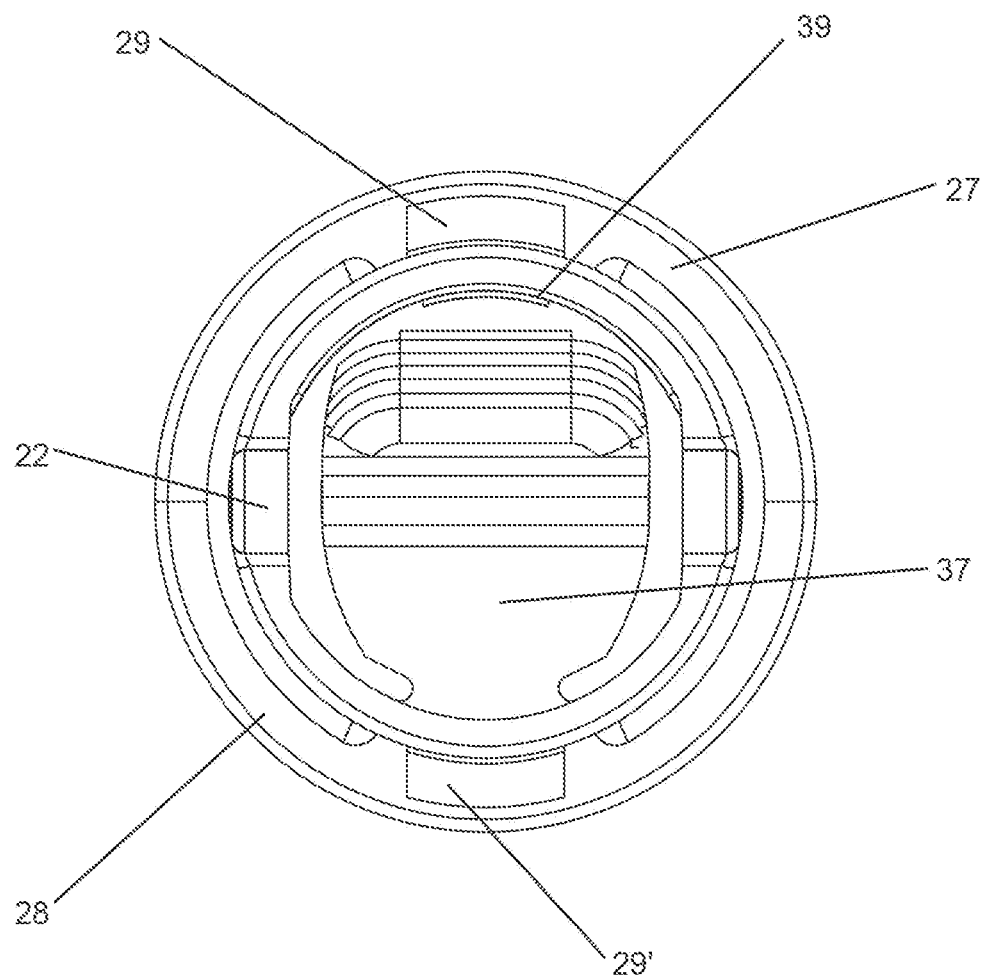
FIG. 10 is an opposite end view of an embodiment of the present invention in a folded state.

Referring to the inside perspective view of the illustrated embodiment shown in FIG. 6, it is seen that in this exemplary embodiment a gripping finger 35 is provided on the inside of cylindrical half 25. This finger 35 protrudes out and away from the internal concave surface of half 25 as shown in the side view of FIG. 3, and the end views of FIGS. 4 and 5. The proximal end of finger 35 is hingedly and/or flexibly attached to the interior concave surface of half 25. The distal end of finger 35 is provided with a frictional surface 37 that is used to engage and grip one or more wires 49 extending through the unit. In the illustrated embodiment of FIG. 6, the distal frictional surface 37 of finger 35 is provided in the form of a plurality of parallel ridges. It is to be appreciated that other frictional surfaces may be employed including without limitation, rough texture, teeth, and the like, and combinations thereof. In the illustrated embodiment, the ridges 37 engage one or more wires 49 as shown in the sectional view of FIG. 11. It is to be appreciated that finger 35 should preferably be angled toward the open end of the half where it is provided in order to securely engage and hold one or more wires, although other angles may also be used in conjunction with appropriate complementary frictional surfaces on the opposite half. In the illustrated embodiment, semi-circular flange 27 is provided at the open end of the other half 23, and finger 35 is angled in this direction.

Figure 11:
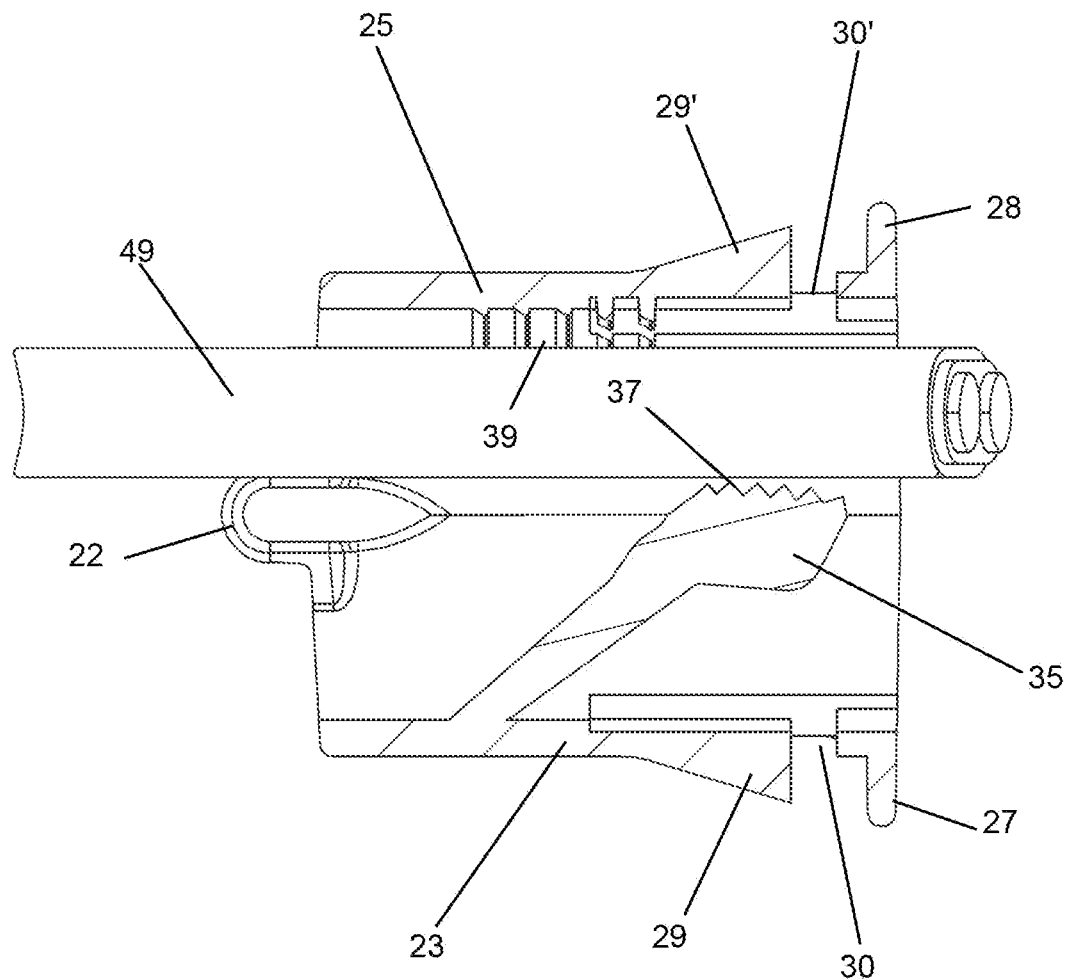
FIG. 11 is a sectional side view of an embodiment of the present invention in a folded state holding a wire.

In the exemplary embodiment illustrated in FIG. 6, it is seen that one or more complementary frictional surfaces 39 are provided on the inside concave surface of the other semi-circular half 23. The frictional surfaces 39 on the other half 23 may be the same as or different from those found at the distal end of finger 35. It is to be appreciated that these frictional surfaces 39 may be provided directly across from the frictional surface 37 of finger 35 (when the two halves 23, 25 are closed), or they may be offset therefrom, as illustrated in FIG. 11. It is to be appreciated that multiple frictional surfaces 39 may be provided on the inside surface of the other half 23, and that these surfaces may be the same or they may be different from each other (e.g., ridges, teeth, rough texture, etc., and combinations thereof).

In other embodiments (not shown) multiple fingers may be provided. For example, and without limitation, one finger may be provided in each of halves 23 and 25. When two fingers are provided, they may each be angled away from the central opening of the unit and toward the closest outside edge. In embodiments having a finger in each half, the fingers may meet each other when the halves are closed, or the fingers may be offset such that they each engage a frictional surface on the opposite half when closed.

In further embodiments (not shown), no fingers are provided; instead, a plurality of outwardly protruding members such as, without limitation, ridges or teeth may be provided on the inside surfaces of one or both halves 23, 25. These protruding members may be provided with frictional surfaces thereon. The protruding members may be the same inside both halves 23, 25 (e.g. teeth may be provided inside first half 23 and teeth may be provided inside second half 25), or they may be different (e.g., teeth may be provided inside first half 23, and ridges inside second half 25). In some embodiments, the protruding members may meet each other when the two halves are closed. The protruding members may be slightly deformable. In other embodiments, the protruding members may not meet, leaving a gap for wires 49. The heights of the protruding members may be varied to create different sized gaps therebetween when the halves are closed. In other embodiments, a plurality of protruding members or fingers may be provided in one or both halves 23, 25. The protruding members may be across from or offset from each other, and may interleave when the two halves are closed. In some embodiments one or more large protruding members may be provided on only one of the halves.

Figure 12:
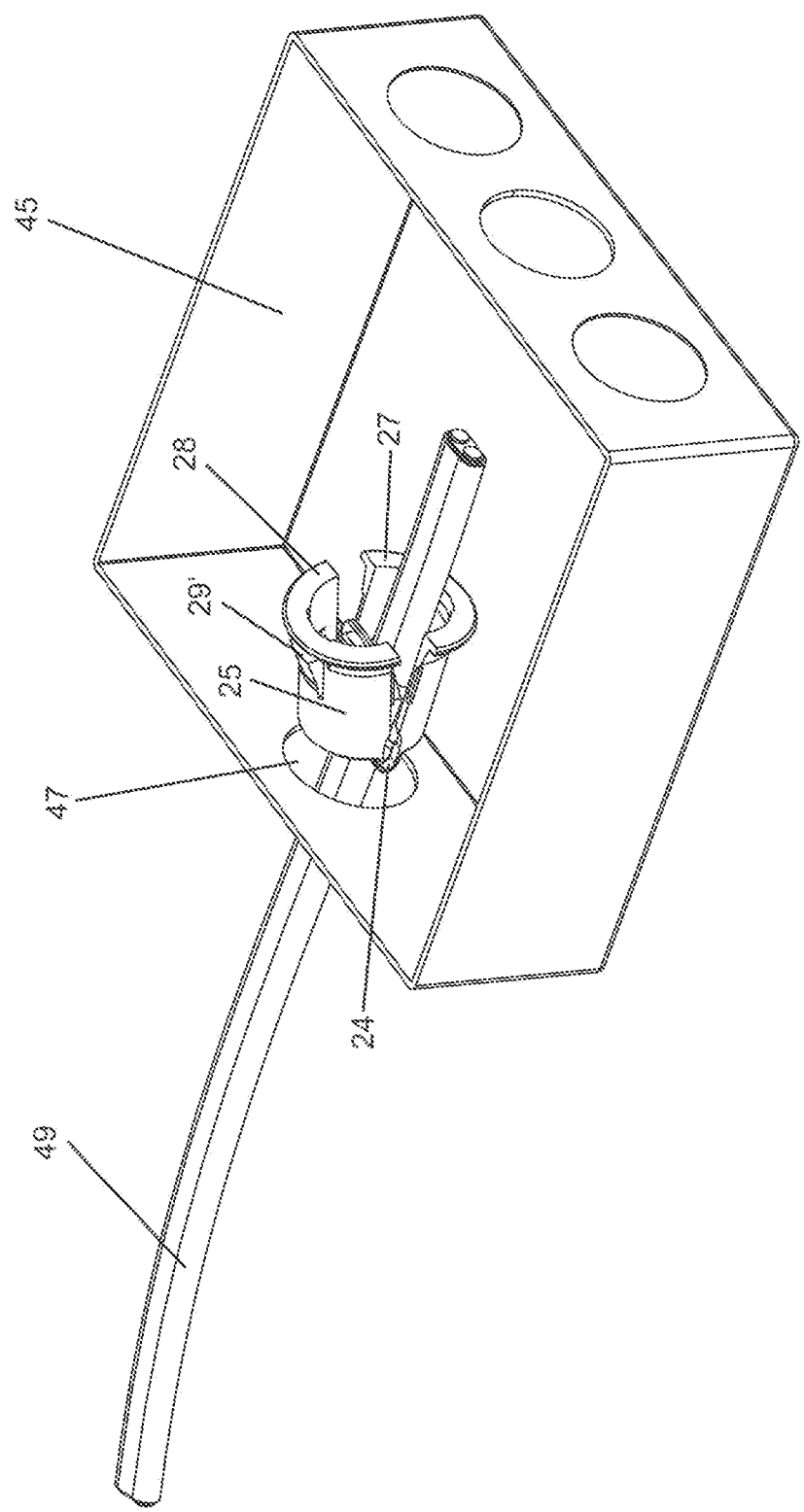
FIG. 12 is a perspective environmental view of an embodiment of the present invention in an electrical box in which two halves have been partially closed over a wire.
Figure 13:
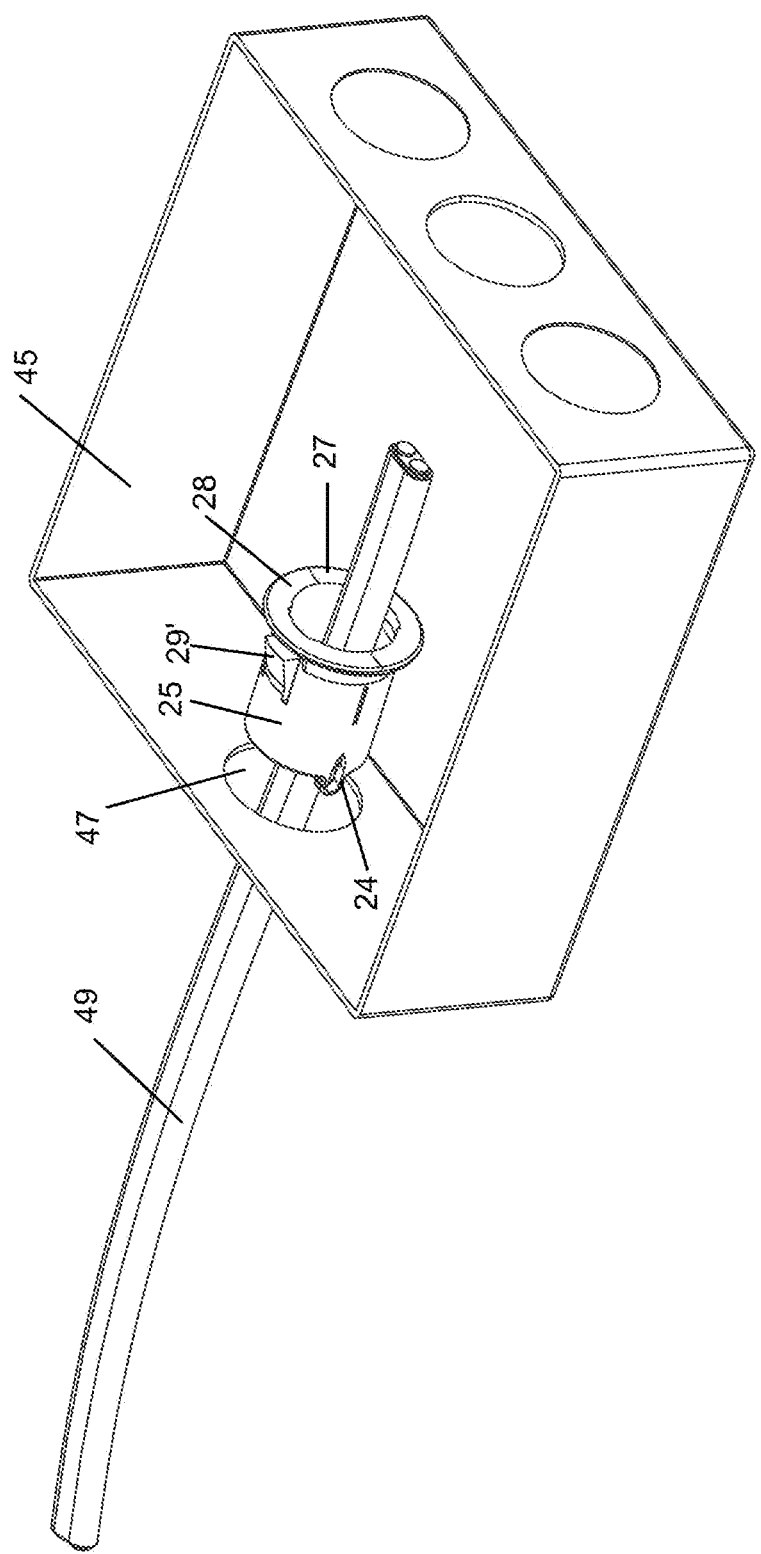
FIG. 13 is a perspective environmental view of an embodiment of the present invention in an electrical box in which two halves of the invention have been fully closed over a wire.
Figure 14:
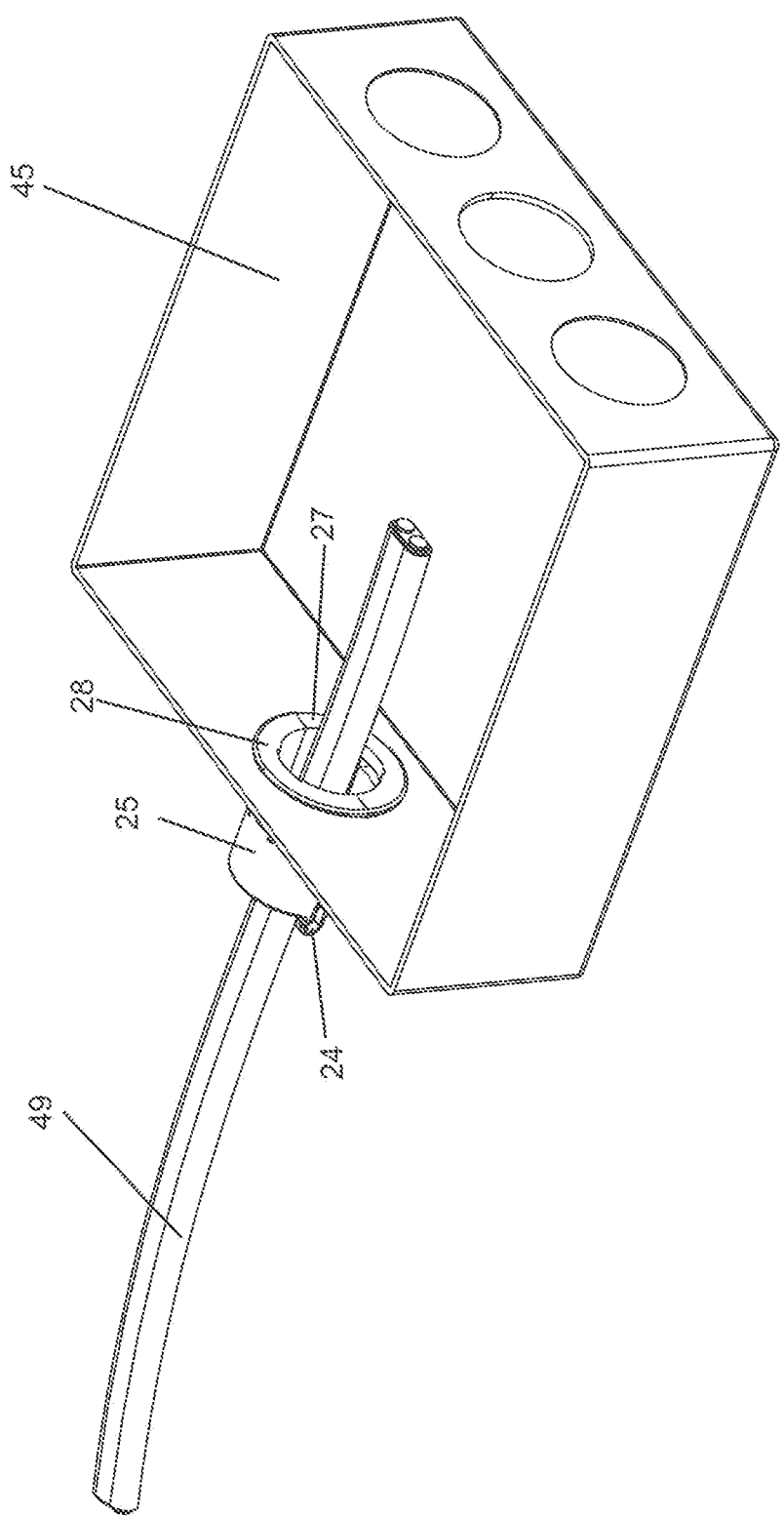
FIG. 14 is a perspective environmental view of an embodiment of the present invention in an electrical box in which two halves of the invention have been fully closed over a wire, and the invention has been inserted into a knockout hole of an electrical box.

Installation of an exemplary unit of the present invention into a knockout hole of an electrical box 45 is illustrated in FIGS. 12-14. It is to be appreciated that similar steps may be followed to insert a unit into an electrical panel. In this illustrated embodiment, a single wire 49 is run to an electrical box 45 through knockout hole 47. The wire 49 is first passed from the outside of an electrical box to the inside of the box through a knockout hole, and then threaded through the central opening 26 of an unfolded unit 21, as shown in FIG. 12. It is seen that the wire 49 is threaded into the central opening 26 such that the outside (convex side) of the unfolded unit 21 faces and is closest to the knockout hole 47. Although a single wire 49 is illustrated, it is to be appreciated that multiple wires 49 may be inserted in the same way. The unit 21 is placed on the wire(s) 49 at a position that provides a desired amount of slack on the inside of the electrical box 45.

The semi-circular halves 23, 25 of the illustrated exemplary unit are then folded together to form a cylinder around the wire(s) as shown in FIG. 13. This causes the gripping member(s) such as frictional surface(s) 37, 39 or finger(s) 35 inside the unit to firmly grip the wire(s) extending therethrough. The closed unit, now firmly secured to the wire(s), is then pushed through the knockout hole 47 from which the wire(s) enter the unit, causing the longitudinal tabs 29 to pop through the hole, thereby holding the unit against the outside of the box. The two semi-circular halves 27, 28 form a circular flange that is flush against an inside surface of the box 45 around the knockout hole 47, as shown in FIG. 14.

It is to be appreciated that the engagement of the longitudinal tabs 29 and the circular flange 27, 28 with the knockout hole 47 in the electrical box 45 keeps the two halves 23, 25 of the unit securely engaged with each other and with the electrical box 45, thereby securely holding the wire(s) 49 contained therein. It is also to be appreciated that the entire installation a unit 21 of the present invention, including removal of a pre-existing clamp and replacement with a unit of the present invention, may be accomplished from inside the electrical box 45, avoiding the need to access the exterior of the box 45 which could result in damage to surrounding existing walls.

In an alternative method, the unit 21 may first be slotted into the knockout hole 47 from the inside of the box 45, after which the wires or cables 49 are run through the installed unit 21.

It is to be understood that variations and modifications of the present invention may be made without departing from the scope thereof. In particular, and without limitation, each of the various features and/or aspects of each embodiment disclosed herein may be used with other features and/or aspects of other embodiment disclosed herein in different combinations. Other combinations of features of the various embodiments disclosed herein are also included within the scope of the invention. It is also to be understood that the present invention is not to be limited by the specific embodiments disclosed herein, but only in accordance with the appended claims when read in light of the foregoing specification.

What is claimed is:

1. A wire clamp apparatus for use with an electrical box or panel comprising:
    a semi-cylindrical unit having a convex exterior surface and a concave interior surface;
    a central opening bisecting the unit into a first semi-cylindrical half and a second semi-cylindrical half, with two hinge members located at opposite ends of said central opening which movably connect the first and second halves together;
    a first semi-circular peripheral flange located at an open end of said first half opposite from said central opening, and at least one deformable tapered tab located on said exterior surface adjacent to said first peripheral flange;
    a second semi-circular peripheral flange located at an open end of said second half opposite from said central opening, and at least one second deformable tapered tab located on said exterior surface adjacent to said second peripheral flange; and
    a gripping member provided on an interior of at least one of said semi-cylindrical halves of said unit.

2. The apparatus of claim 1 further comprising a second gripping member provided on an interior surface of the other of said semi-cylindrical halves of said unit.

3. The apparatus of claim 1 wherein said gripping member is provided in the form of a plurality of outwardly extending ridges.

4. The apparatus of claim 2 wherein said gripping member and said second gripping member are provided in the form of a plurality of outwardly extending ridges.

5. The apparatus of claim 1 wherein said gripping member is provided in the form of a plurality of outwardly extending teeth.

6. The apparatus of claim 2 wherein said gripping member and said second gripping member are provided in the form of a plurality of outwardly extending teeth.

7. The apparatus of claim 1 wherein said gripping member is provided in the form of a rough frictional surface.

8. The apparatus of claim 2 wherein said gripping member and said second gripping member are provided in the form of rough frictional surfaces.

9. The apparatus of claim 1 wherein said gripping member is provided in the form of an outwardly extending movable finger having a plurality of teeth at a distal end thereof.

10. The apparatus of claim 2 wherein said gripping member is provided in the form of an outwardly extending movable finger having a plurality of teeth at a distal end thereof, and said second gripping members is provided in the form of a plurality of outwardly extending ridges.

11. The apparatus of claim 1 wherein said gripping member is provided in the form of an outwardly extending movable finger having a plurality of ridges at a distal end thereof.

12. The apparatus of claim 2 wherein said gripping member is provided in the form of an outwardly extending movable finger having a plurality of ridges at a distal end thereof, and said second gripping member is provided in the form of a plurality of outwardly extending ridges.

13. The apparatus of claim 1 wherein said gripping member is provided in the form of an outwardly extending movable finger having a rough frictional surface a distal end thereof.

14. The apparatus of claim 2 wherein said gripping member is provided in the form of an outwardly extending movable finger having a rough frictional surface at a distal end thereof, and said second gripping member is provided in the form of a plurality of outwardly extending ridges.

15. The apparatus of claim 2 wherein said gripping member and said second gripping member are provided in the form of outwardly extending movable fingers having a plurality of teeth at distal ends thereof.

16. A method for securely holding one or more wires in an electrical box comprising the steps of:
    a. passing at least one wire from outside the electrical box to an inside of the box by extending an end of the at least one wire through a knockout hole in the box;
    b. passing the end of said at least one wire through a central opening of a semi-cylindrical unit having a convex exterior side and a concave interior side such that the end of the at least one wire is on the concave interior side of the unit, the opening bisecting the unit into a first semi-cylindrical half and a second semi-cylindrical half, the unit having two hinge members located at opposite ends of said central opening which movably connect the first and second halves together, the unit having at least one frictional surface or member on said concave interior side;
    c. folding the two semi-cylindrical halves together to form a cylinder around the at least one wire such that the at least one frictional surface or member firmly engages the at least one wire; and
    d. inserting the formed cylinder into the knockout hole.

17. The method of claim 16 wherein semi-circular flanges are provided at opposite ends of said unit such that a circular flange is formed during the step of folding the two semi-cylindrical halves together.

18. The method of claim 17 wherein the circular flange is flush against an inside surface of the box after the formed cylinder is inserted into the knockout hole.

19. The method of claim 18 wherein at least one deformable tab is provided on the convex side of said unit adjacent to each of said semi-circular flanges, such that when the formed cylinder is inserted into the knockout hole, the tabs deform and then pop back such that the semi-circular flanges and the tabs hold the cylinder in place in the knockout hole.

* * * * *